(12) United States Patent
    Tsai

(10) Patent No.: US 12,495,350 B2
(45) Date of Patent: Dec. 9, 2025

(54) TRANSMISSION PATH IMPROVING METHOD IN A MESH NETWORK, ELECTRONIC DEVICE AND COMPUTER-READABLE STORAGE MEDIUM

(71) Applicant: Nanning FuLian FuGui Precision Industrial Co., Ltd., Nanning (CN)

(72) Inventor: Hsi-Chen Tsai, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 383 days.

(21) Appl. No.: 18/111,734

(22) Filed: Feb. 20, 2023

(65) Prior Publication Data

US 2024/0284302 A1    Aug. 22, 2024

(51) Int. Cl.
    H04B 7/00     (2006.01)
    H04W 40/12    (2009.01)
    H04W 40/20    (2009.01)
    H04W 84/18    (2009.01)

(52) U.S. Cl.
    CPC ........... H04W 40/20 (2013.01); H04W 40/12 (2013.01); H04W 84/18 (2013.01)

(58) Field of Classification Search
    CPC ...... H04W 40/20; H04W 40/12; H04W 84/18
    See application file for complete search history.

(56) References Cited

U.S. PATENT DOCUMENTS

| | | | | |
|---|---|---|---|---|
| 2007/0274268 A1* | 11/2007 | Axelsson | .............. | H04W 40/18 370/338 |
| 2007/0280192 A1* | 12/2007 | Yagyu | .................. | H04W 40/02 370/349 |
| 2011/0128918 A1* | 6/2011 | Zhai | ....................... | H04L 45/125 370/328 |
| 2011/0176487 A1* | 7/2011 | Zhai | ....................... | H04L 45/124 370/328 |
| 2012/0166582 A1* | 6/2012 | Binder | .................... | G06F 21/80 709/217 |
| 2021/0175971 A1 | 6/2021 | Vardarajan et al. | | |
| 2022/0030445 A1* | 1/2022 | Williams | ............. | H04B 17/318 |
| 2022/0104100 A1* | 3/2022 | M | ......................... | H04W 84/18 |
| 2022/0124548 A1 | 4/2022 | Srivastava | | |
| 2022/0131797 A1* | 4/2022 | Hua | ......................... | H04L 45/74 |
| 2023/0388781 A1* | 11/2023 | Yin | ........................ | H04W 8/16 |
| 2024/0275429 A1* | 8/2024 | Le | ............................ | G01S 3/14 |

FOREIGN PATENT DOCUMENTS

TW    201018276 A    5/2010

* cited by examiner

Primary Examiner — Abdelnabi O Musa
(74) Attorney, Agent, or Firm — ScienBiziP, P.C.

(57) ABSTRACT

A transmission path improving method in a mesh network is disclosed. General transmission paths connecting to each of routers and Ultra-Wideband (UWB) transmission paths connecting to each of UWB devices are calculated. If a client is located within a detection range of a UWB device, an optimal transmission path relating to the UWB device is selected from the UWB transmission paths and the optimal transmission path is transmitted to the client.

12 Claims, 5 Drawing Sheets

TRANSMISSION PATH IMPROVING METHOD IN A MESH NETWORK, ELECTRONIC DEVICE AND COMPUTER-READABLE STORAGE MEDIUM

FIELD

The disclosure relates to packet transmission, and more particularly to a transmission path improving method in a mesh network.

BACKGROUND

In a mesh network, environment, for example, Mesh Wi-Fi, each router is connected to each other. The transmission structure of the entire network environment is relatively complex, and the mesh system automatically selects best connection ways for network devices. In addition, router nodes can communicate with each other and, when a router node is damaged, the mesh system automatically adjusts transmission paths that bypasses the damaged router node, thereby maintaining normal operations of the mesh system.

However, problems with the Mesh Wi-Fi arise when the device forwards packets, delay and rate reduction caused by the delay may be occurred. Each time the router forwarding the packet causes the delay and, therefore, multiple forwarding of the packet can quickly increase the delay. Thus, the mesh networking solution is not suitable for networks that require high immediacy. Further, the packet forwarding in the mesh network may decrease the transmission rate, so too many nodes should not be provided to the mesh network to affect the bandwidth capacity.

Thus, an efficient method is needed to solve the above problems.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1A:
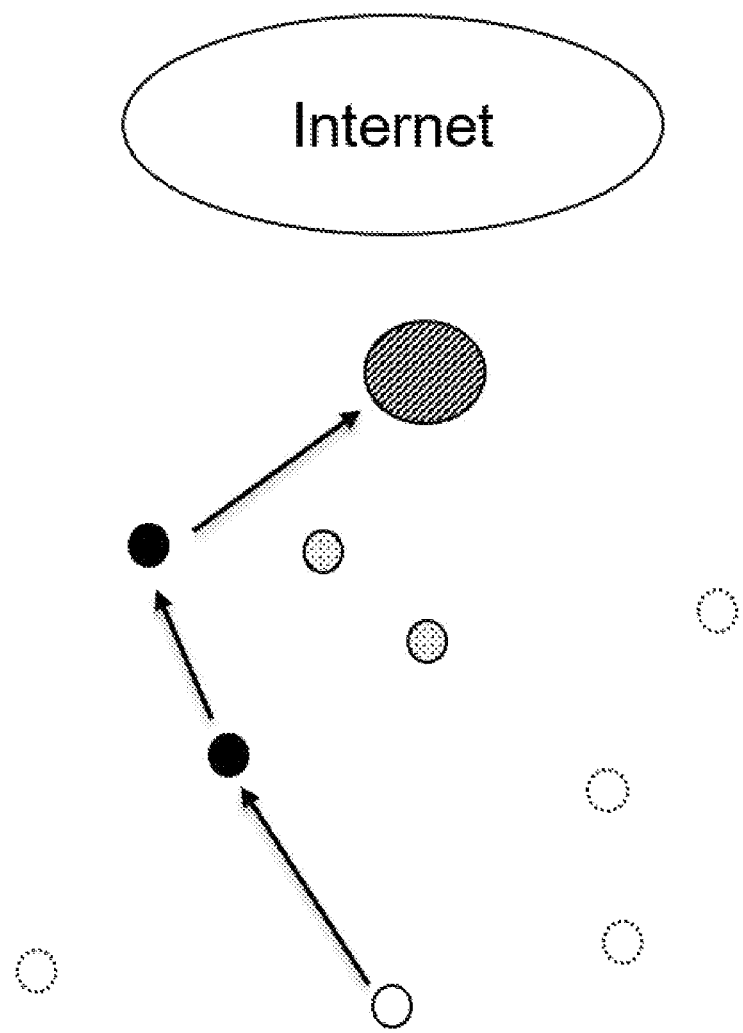
FIGS. 1A and 1B are schematic diagrams of an embodiment of an application of a transmission path improving method in a mesh network of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "comprising," when utilized, means "including, but not necessarily limited to"; it specifically indicates open-ended inclusion or membership in the so-described combination, group, series, and the like.

Figure 1B:
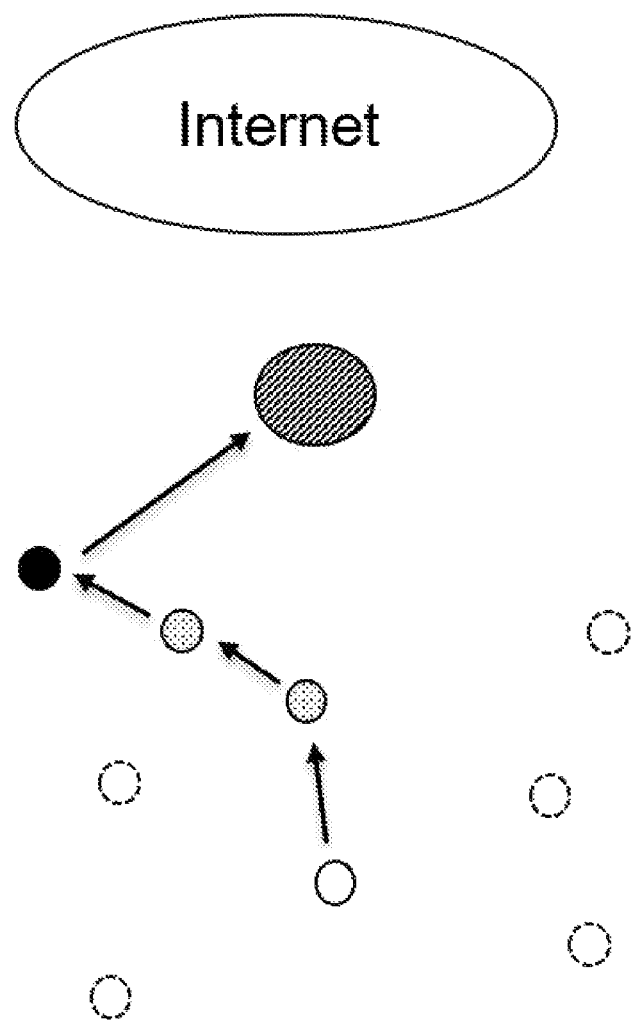

FIGS. 1A and 1B are schematic diagrams of an embodiment of an application of a transmission path improving method in a mesh network of the present disclosure.

Referring to FIG. 1A, a mesh network of the embodiment comprises a client 110, a destination router 120 and multiple router nodes 1-8. The router nodes 1 and 2 are active nodes, the router nodes 3 and 4 are Ultra-Wideband (UWB) nodes, while the router nodes 5-8 are idle nodes. Initially, the transmission path from the client 110 to the destination router 120 are represented as "client 110→node 1→node 2→destination router 120".

Referring to FIG. 1B, when the client 110 moves and detects UWB devices, the destination router 120 configures the UWB devices as router nodes and generates a new routing path to replace the original routing path. The client 110 detects two UWB devices and the destination router 120 configures the two UWB devices as router nodes 3 and 4. At this time, the transmission path from the client 110 to the destination router 120 are represented as "client 110→node 3→node 4→destination router 120". Meanwhile, the node 1 is converted as an idle node.

Figure 2:
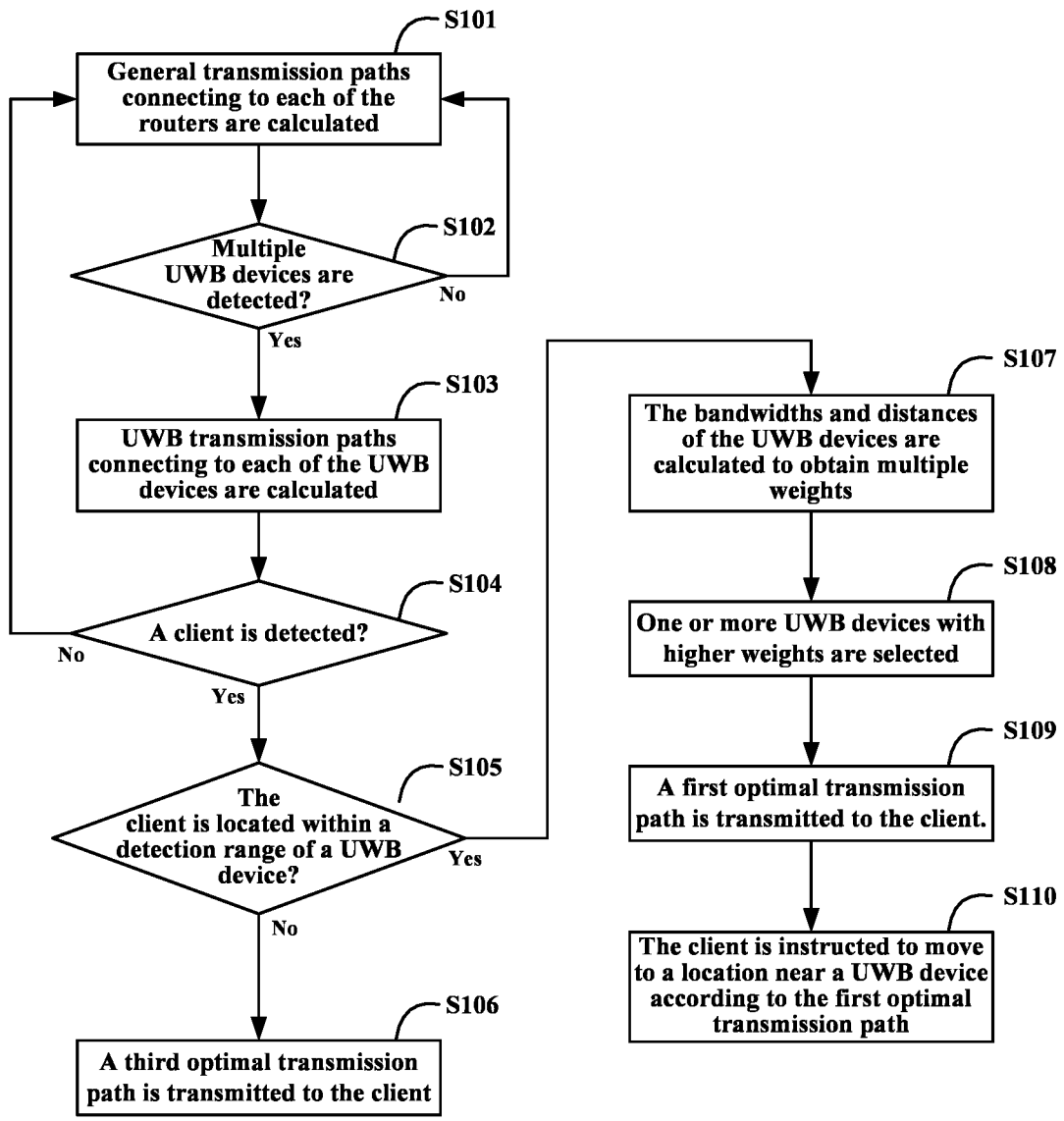
FIG. 2 is a flowchart of an embodiment of a transmission path improving method in a mesh network of the present disclosure.

FIG. 2 is a flowchart of an embodiment of a transmission path improving method in a mesh network of the present disclosure. According to different needs, the order of the steps in the flowchart can be changed, and some steps can be omitted.

In step S101, a master router calculates general transmission paths connecting to each of the routers in a mesh network based on Dynamic Source Routing (DSR). It is noted that the DSR is known to the public and is not further described.

Further, the mesh network architecture includes multiple routers and one of the routers is selected from the mesh network as a master router. The master router initially calculates transmission paths of each router through other routers and transmits the calculated multiple transmission paths to the other routers. When the master router fails to work, another router is chosen from the mesh network as a new master router.

In step S102, the master router determines whether multiple UWB devices are detected.

In step S103, if multiple UWB devices are detected, the master router calculates a plurality of UWB transmission paths connecting to each of the UWB devices in the mesh network.

In step S104, the master router determines whether a client is detected.

In step S105, if a client is detected, the master router determines whether the client is located within a detection range of at least one UWB device.

In step S106, if the client is not located within the detection range of any UWB device, the master router selects a third optimal transmission path from the general transmission paths and transmits the third optimal transmission path to the client, enabling the client to perform data transmission according to the third optimal transmission path.

In step S107, if the client is located within detection ranges of multiple UWB devices, the master router calculates the bandwidths and distances of each of the UWB devices, and designates the calculated bandwidths and distances as weights to obtain multiple weights of the UWB devices. Additionally, it is noted that the calculation of the bandwidths and distances of each of the UWB devices is a prior art and is not further described herein.

In step S108, the master router selects one or more UWB devices with higher weights according to the weights.

In step S109, the master router selects a first optimal transmission path from the UWB transmission paths according to the selected UWB devices and transmits the first optimal transmission path to the client.

In step S110, the master router instructs the client to move to a location near a proposed UWB device according to the first optimal transmission path, so that the client performs data transmission according to the first optimal transmission path.

Figure 3:
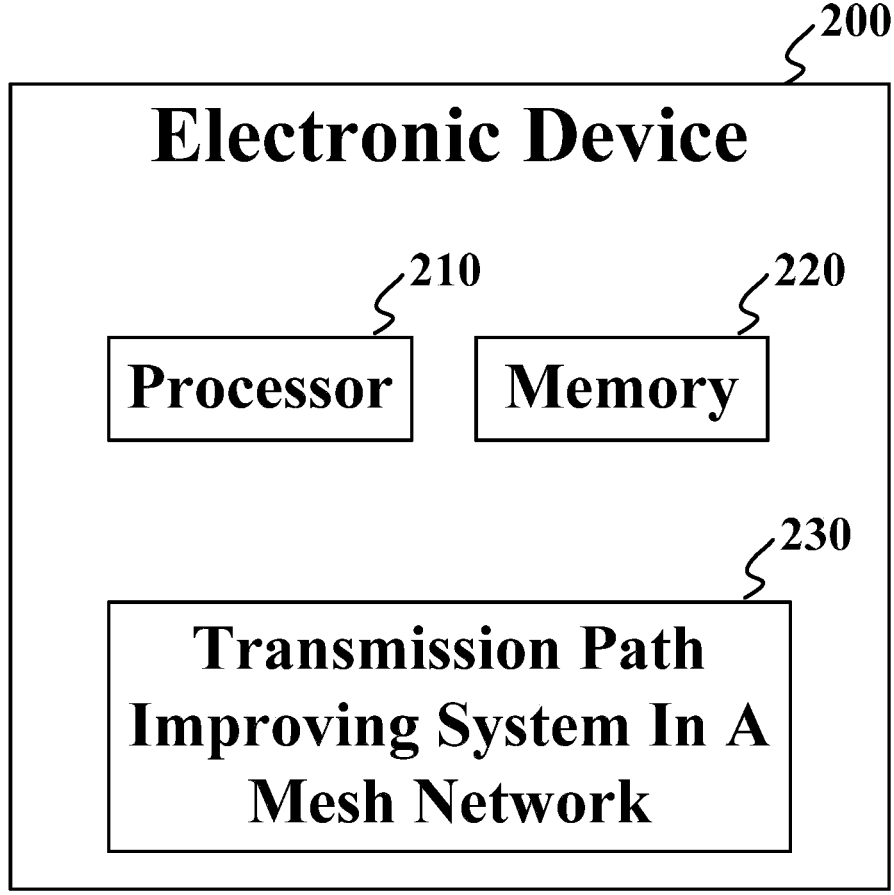
FIG. 3 is a block diagram of an embodiment of the hardware architecture of an electronic device using the method of the present disclosure.

FIG. 3 is a block diagram of an embodiment of the hardware architecture of an electronic device using the transmission path improving method in a mesh network of the present disclosure. The electronic device 200 may be, but is not limited to, connected to a processor 210, a memory 220, and a transmission path improving system in a mesh network 230 via system buses. The electronic device 200 shown in FIG. 3 may include more or fewer components than those illustrated or may combine certain components.

The memory 220 stores a computer program, such as the transmission path improving system in a mesh network 230, which is executable by the processor 210. When the processor 210 executes the transmission path improving system in a mesh network 230, the blocks in one embodiment of the booting mode configuration method applied in the electronic device 200 are implemented, such as blocks S101 to S110 shown in FIG. 2.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the transmission path improving system in a mesh network 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The transmission path improving system in a mesh network 230 can be partitioned into one or more modules/units that are stored in the memory 220 and executed by the processor 210. The one or more modules/units may be a series of computer program instructions capable of performing particular functions of the transmission path improving system in a mesh network 230.

Figure 4:
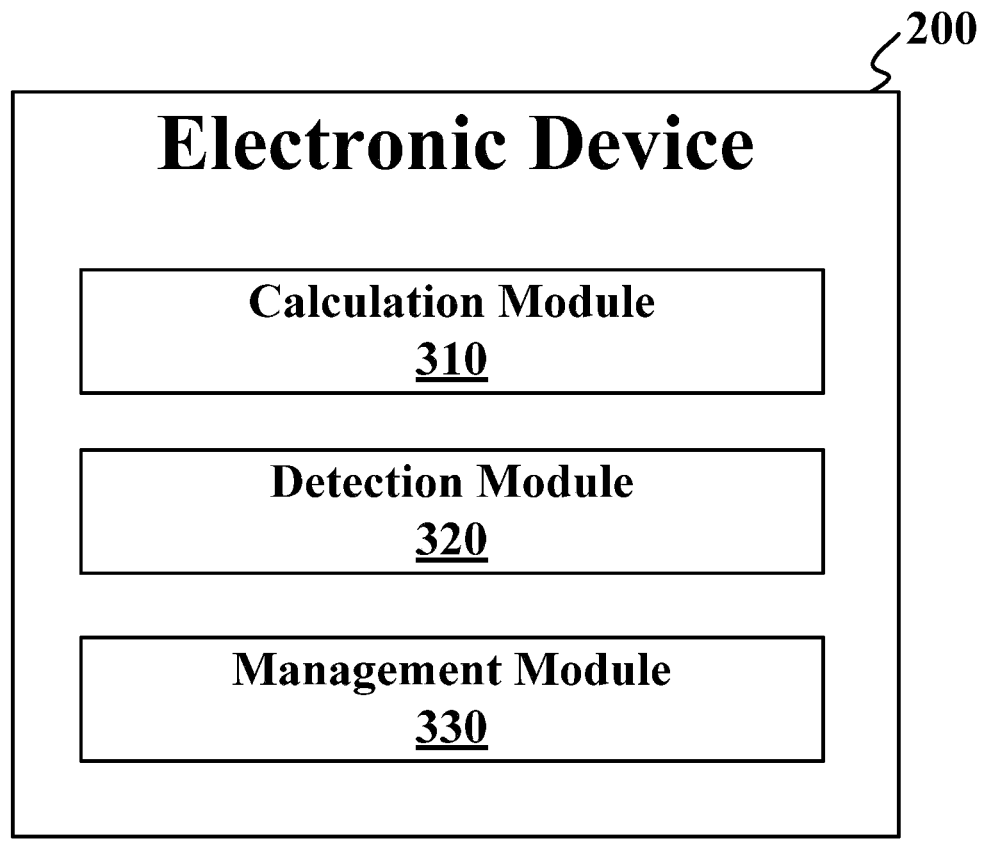
FIG. 4 is a block diagram of an embodiment of functional blocks of an electronic device of the present disclosure.

FIG. 4 is a schematic diagram of an embodiment of functional blocks of the electronic device using the method of the present disclosure.

The electronic device 200 comprises a calculation module 310, a detection module 320 and a management module 330.

The calculation module 310 calculates general transmission paths connecting to each of the routers in a mesh network based on Dynamic Source Routing (DSR). It is noted that the DSR is known to the public and is not further described herein.

Further, the mesh network architecture includes multiple routers and one of the routers is selected from the mesh network as a master router. The master router initially calculates transmission paths of each router through other routers and transmits the calculated multiple transmission paths to the other routers. When the master router fails to work, another router is chosen from the mesh network as a new master router.

The detection module 320 determines whether multiple UWB devices are detected.

If multiple UWB devices are detected, the calculation module 310 calculates a plurality of UWB transmission paths connecting to each of the UWB devices in the mesh network.

The detection module 320 determines whether a client is detected.

If a client is detected, the detection module 320 determines whether the client is located within a detection range of at least one UWB device.

If the client is not located within the detection range of any UWB device, the management module 330 selects a third optimal transmission path from the general transmission paths and transmits the third optimal transmission path to the client, enabling the client to perform data transmission according to the third optimal transmission path.

If the client is located within detection ranges of multiple UWB devices, the calculation module 310 calculates the bandwidths and distances of each of the UWB devices, and designates the calculated bandwidths and distances as weights to obtain multiple weights of the UWB devices. Additionally, it is noted that the calculation of the bandwidths and distances of each of the UWB devices is a prior art and is not further described herein.

The management module 330 selects one or more UWB devices with higher weights according to the weights.

The management module 330 selects a first optimal transmission path from the UWB transmission paths according to the selected UWB devices, and transmits the first optimal transmission path to the client.

The management module 330 instructs the client to move to a location near a proposed UWB device according to the first optimal transmission path, so that the client performs data transmission according to the first optimal transmission path.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A transmission path improving method in a mesh network executable by an electronic device, the transmission path improving method comprising:
    calculating general transmission paths connecting to each of the routers in a mesh network based on Dynamic Source Routing (DSR);
    determining whether multiple Ultra-Wideband (UWB) devices are detected;
    responsive to determining that multiple UWB devices are detected, calculating a plurality of UWB transmission paths connecting to each of the UWB devices in the mesh network;
    determining whether a client is detected, wherein:
    responsive to determining that a client is detected, determining whether the client is located within a detection range of at least one UWB device, and
    responsive to determining that the client is located within a detection range of a first UWB device, selecting a first optimal transmission path relating to the first UWB device from the UWB transmission paths and transmitting the first optimal transmission path to the client; and
    instructing the client to move to a first location near the first UWB device according to the first optimal transmission path, enabling the client to perform data transmission according to the first optimal transmission path.

2. The transmission path improving method of claim 1, further comprising:
    responsive to determining that the client is located within detection ranges of multiple UWB devices, calculating bandwidths and distances of each of the UWB devices;
    designating the calculated bandwidths and distances as weights to obtain multiple weights of the UWB devices;
    selecting multiple second UWB devices having weights higher than a preset weight;
    selecting a second UWB devices from the multiple second UWB devices; and
    selecting a second optimal transmission path relating to the second UWB device from the UWB transmission paths and transmitting the second optimal transmission path to the client.

3. The transmission path improving method of claim 2, further comprising:
    instructing the client to move to a second location near the second UWB device according to the second optimal transmission path, enabling the client to perform the data transmission according to the second optimal transmission path.

4. The transmission path improving method of claim 1, further comprising:
    responsive to determining that the client is not located within the detection range of any UWB device, selecting a third optimal transmission path from the general transmission paths and transmitting the third optimal transmission path to the client, enabling the client to perform the data transmission according to the third optimal transmission path.

5. An electronic device comprising:
    a management module;
    a calculation module configured to calculate general transmission paths connecting to each of the routers in a mesh network based on DSR; and
    a detection module configured to determine whether multiple Ultra-Wideband (UWB) devices are detected;
    wherein:
    responsive to determining that multiple UWB devices are detected, the calculation module calculates a plurality of UWB transmission paths connecting to each of the UWB devices in the mesh network;
    the detection module determines whether a client is detected and, if a client is detected, determines whether the client is located within a detection range of at least one UWB device; and
    responsive to determining that the client is located within a detection range of a first UWB device, the management module selects a first optimal transmission path relating to the first UWB device from the UWB transmission paths and transmits the first optimal transmission path to the client, and instructs the client to move to a first location near the first UWB device according to the first optimal transmission path, enabling the client to perform data transmission according to the first optimal transmission path.

6. The device of claim 5, wherein
    the calculation module, responsive to determining that the client is located within detection ranges of multiple UWB devices, calculates bandwidths and distances of each of the UWB devices, and designates the calculated bandwidths and distances as weights to obtain multiple weights of the UWB devices; and
    the management module selects multiple second UWB devices having weights higher than a preset weight, selects a second UWB devices from the multiple second UWB devices, selects a second optimal transmission path relating to the second UWB device from the UWB transmission paths, and transmits the second optimal transmission path to the client.

7. The device of claim 6, wherein
    the management module instructs the client to move to a second location near the second UWB device according to the second optimal transmission path, enabling the client to perform the data transmission according to the second optimal transmission path.

8. The device of claim 5, wherein
    the management module, responsive to determining that the client is not located within the detection range of any UWB device, selects a third optimal transmission path from the general transmission paths and transmits the third optimal transmission path to the client, enabling the client to perform the data transmission according to the third optimal transmission path.

9. A non-transitory computer-readable storage medium storing game program which causes a computer to execute:
    a process of calculating general transmission paths connecting to each of the routers in a mesh network based on Dynamic Source Routing (DSR);
    a process of determining whether multiple Ultra-Wideband (UWB) devices are detected;
    a process of, responsive to determining that multiple UWB devices are detected, calculating a plurality of UWB transmission paths connecting to each of the UWB devices in the mesh network;
    a process of determining whether a client is detected;

a process of, responsive to determining that a client is detected, determining whether the client is located within a detection range of at least one UWB device;

a process of, responsive to determining that the client is located within a detection range of a first UWB device, selecting a first optimal transmission path relating to the first UWB device from the UWB transmission paths and transmitting the first optimal transmission path to the client; and a process of instructing the client to move to a first location near the first UWB device according to the first optimal transmission path, enabling the client to perform data transmission according to the first optimal transmission path.

10. The storage medium of claim 9, further comprising:

a process of, responsive to determining that the client is located within detection ranges of multiple UWB devices, calculating bandwidths and distances of each of the UWB devices;

a process of designating the calculated bandwidths and distances as weights to obtain multiple weights of the UWB devices;

a process of selecting multiple second UWB devices having weights higher than a preset weight;

a process of selecting a second UWB devices from the multiple second UWB devices; and a process of selecting a second optimal transmission path relating to the second UWB device from the UWB transmission paths and transmitting the second optimal transmission path to the client.

11. The storage medium of claim 10, further comprising:

a process of instructing the client to move to a second location near the second UWB device according to the second optimal transmission path, enabling the client to perform the data transmission according to the second optimal transmission path.

12. The storage medium of claim 9, further comprising:

a process of, responsive to determining that the client is not located within the detection range of any UWB device, selecting a third optimal transmission path from the general transmission paths and transmitting the third optimal transmission path to the client, enabling the client to perform the data transmission according to the third optimal transmission path.

* * * * *